United States Patent [19]

Nishioka

[11] Patent Number: 5,034,460

[45] Date of Patent: Jul. 23, 1991

[54] COATING OF VINYLIDENE FLUORIDE POLYMER AND FLUORINE CONTAINING GRAFT COPOLYMER

[75] Inventor: Akinori Nishioka, Yokkaichi, Japan

[73] Assignee: Atochem North America, Inc., Philadelphia, Pa.

[21] Appl. No.: 356,028

[22] Filed: May 23, 1989

[30] Foreign Application Priority Data

May 31, 1988 [JP] Japan .................. 63-133722

[51] Int. Cl.$^5$ .................. C08G 63/48; C08G 63/91
[52] U.S. Cl. .................. 525/72; 525/70
[58] Field of Search .................. 525/72, 70

[56]  References Cited

U.S. PATENT DOCUMENTS

| | | | |
|---|---|---|---|
| 3,324,069 | 6/1967 | Koblitz et al. | 260/31.4 |
| 4,382,358 | 5/1983 | Tappe et al. | 525/72 |
| 4,642,249 | 2/1987 | Goll | 524/520 |

FOREIGN PATENT DOCUMENTS

| | | | |
|---|---|---|---|
| 2952456 | 7/1990 | Fed. Rep. of Germany | 525/72 |
| 174247 | 7/1987 | Japan . | |

*Primary Examiner*—John C. Bleutge
*Assistant Examiner*—W. R. H. Clark
*Attorney, Agent, or Firm*—Seidel, Gonda, Lavorgna & Monaco

[57]  ABSTRACT

A vinylidene fluoride-based polymer-containing coating composition provides coatings having weather resistance, chemical stability, surface lubricity, and enhanced adhesion to substrates. The composition comprises:

(a) a vinylidene fluoride-based polymer;
(b) a graft polymer formed from the graft polymerization of an alkyl methacrylate onto a fluorine-containing polymer; and
(c) at least one organic solvent.

7 Claims, No Drawings

COATING OF VINYLIDENE FLUORIDE POLYMER AND FLUORINE CONTAINING GRAFT COPOLYMER

FIELD OF THE INVENTION

The invention relates to a coating composition, more particularly to a vinylidene fluoride-based polymer-containing coating composition providing coatings having weather resistance, stain resistance, chemical stability, surface lubricity and adhesion to substrates.

BACKGROUND OF THE INVENTION

Vinylidene fluoride-based polymers are widely used as coating materials, lining materials or molding materials since they have excellent weather resistance, stain resistance, chemical resistance, anti-corrosion properties, and the like.

As is well known, however, vinylidene fluoride-based polymers are chemically inert. Thus, when used as coating materials, they adhere to substrates poorly. In order to improve the poor substrate adhesion properties, it has been proposed to compound an acrylic resin to vinylidene fluoride-based polymers. See, for example, U.S. Pat. Nos. 3,324,069 and 4,642,249, and Japanese Laid-Open Patent Application No. 174247/1977. The adhesive properties of these acrylic resin-compounded vinylidene fluoride-based resin compositions are unsatisfactory. It is necessary to utilize a primer, such as a primer comprising an epoxy resin and urethane resin, in conjunction with these compositions. Alternatively, it is necessary to compound a large amount of acrylic resin to the vinylidene fluoride-based polymer. Compounding large amounts of acrylic resin, however, reduces the inherent properties of the vinylidene fluoride-based polymer. As a result, the aforementioned excellent properties of the vinylidene fluoride-based polymer are not sufficiently exhibited.

The present invention is intended to overcome the above problems. An object the invention is to provide a vinylidene-fluoride based polymer-containing coating composition capable of forming a coating having excellent weather resistance, stain resistance, chemical stability, surface lubricity, and the like, and excellent adhesion to substrates.

SUMMARY OF THE INVENTION

We have found that the foregoing object is attained by compounding to the vinylidene fluoride-based polymer, a polymer formed from the graft polymerization of an alkyl methacrylate onto a fluorine-containing polymer, in place of the conventional acrylic resin.

The present invention is thus directed to a coating composition comprising:
(a) a vinylidene fluoride-based polymer;
(b) a graft polymer formed from the graft polymerization of an alkyl methacrylate onto a fluorine-containing polymer; and
(c) at least one organic solvent.

DETAILED DESCRIPTION OF THE INVENTION

By "vinylidene fluoride-based polymer" as used herein is meant to include not only homopolymers of vinylidene fluoride, but also copolymers, including terpolymers, of vinylidene fluoride and monomers copolymerizable therewith, such as tetrafluoroethylene, hexafluoropropylene, vinyl fluoride, trifluoroethylene, and the like. Typical examples of such copolymers are vinylidene fluoride/tetrafluoroethylene copolymer and vinylidene fluoride/tetrafluoroethylene/hexafluoropropylene terpolymer.

The polymer formed from the graft polymerization of alkyl methacrylate onto a fluoride-containing polymer (hereinafter sometimes referred to merely as a "graft polymer") is, for example, a graft polymer obtained by the graft polymerization of an alkyl methacrylate, such as methyl methacrylate, onto a polymer of a perfluoroalkyl methacrylate. A typical example of such a graft polymer is the comb-like polymer having the tradename "LF-40", produced by Soken Kagaku Co., Ltd., Japan. The aforesaid polymer is a graft copolymerized acryl resin containing a perfluoroalkyl group.

The vinylidene fluoride-based polymer may be mixed with the graft polymer in a weight percent ratio of 60/40 to 95/5, preferably 70/30 to 90/10. If the proportion of vinylidene fluoride-based polymer is in excess of 95% by weight, the adhesion properties of the resulting composition are insufficiently improved. If the proportion of the graft polymer exceeds 40 wt. %, the characteristics of the vinylidene fluoride-based polymer (e.g., weather resistance) are reduced, and a coating composition having the desired properties cannot be obtained.

The organic solvents utilized in the composition of the invention include those organic solvents capable of dissolving or dispersing the vinylidene fluoride-based polymer and the graft polymer at a temperature below the boiling point thereof. Specific examples of such solvents include ketones such as acetone, methyl ethyl ketone, methyl isobutyl ketone, cyclohexanone, and the like; esters such as ethyl acetate, butyl acetate, and the like; polar solvents such as dimethyl acetamide, dimethyl formamide, dimethyl sulfoxide, N-methyl-2-pyrrolidone, and the like; and so on. The solvents may be used alone, or as mixtures comprising two or more solvents. Aromatic hydrocarbons such as benzene, toluene and the like, and aliphatic or alicyclic hydrocarbons such as hexane, heptane, cyclohexane and the like may be used in combination with the above-mentioned organic solvent in an amount which does not inhibit the dissolution of the vinylidene fluoride-based polymer.

The amount of the organic solvent employed in the composition is appropriately determined depending on the intended use of the coating composition. Usually, it is preferred that the organic solvent is present in an amount of from about 100 to about 300 parts by weight, per 100 parts by weight of the total weight of the vinylidene fluoride-based polymer and the graft polymer.

An acrylic polymer compatible with the vinylidene fluoride-based polymer may also be added to the composition, in an amount which does not seriously effect the desired properties of the resulting coating, such as weather resistance, stain resistance, and the like. If an acrylic polymer is employed in the composition, the proportion of vinylidene fluoride-based polymer in the composition is preferably at least 60% by weight based on the weight of the coating composition, and the proportion of the graft polymer added is preferably at least 5% by weight, based on the weight of the coating composition.

Various known additives, such as organic or inorganic pigments, metal powders such as aluminum, copper and the like, ultraviolet absorbers, antioxidants, and the like may also be added to the coating composition of the invention.

The coating composition of the invention may be prepared by mixing the polymers and additives, and dissolving or dispersing the resulting mixture in the organic solvent by known techniques. For example, the polymers and additives may be dispersed in the solvent by employing a dispersion mixer such as a glass bead mill, a homodisperser, and the like.

The coating composition of the invention may be applied to substrates by known techniques such as brush coating, spray coating and the like. When a vinylidene fluoride homopolymer is utilized as the vinylidene fluoride-based polymer in the composition, it is preferred that the coating composition, after coating onto a substrate, is heated to form a coating film, by virtue of the high film-forming temperature of the vinylidene fluoride homopolymer. On the other hand, when a vinylidene fluoride copolymer is utilized in the composition as the vinylidene fluoride-based polymer, it is not necessary to apply heat to the coating, because of the low film-forming temperature of vinylidene fluoride copolymer.

The present invention is described in greater detail with reference to the following non-limiting examples. All parts stated therein are by weight.

EXAMPLE 1

Eighty-five parts of a vinylidene fluoride/tetrafluoroethylene/hexafluoropropylene terpolymer (Kynar® 9301, produced by Pennwalt Corp.) and 15 parts of a graft polymer ("LF-40", Soken Kagaku Co., Ltd.) comprising a graft copolymerized acryl resin having a perfluoroalkyl group as one component, were dissolved in a mixed solvent of 100 parts of methyl ethyl ketone, 100 parts of ethyl acetate and 20 parts of cyclohexanone, to prepare a vinylidene fluoride-based polymer-containing coating composition.

The coating composition was colorless and transparent. When coated on a steel plate and allowed to stand for 24 hours at ordinary temperature, the composition formed a colorless, transparent coating.

The coating was evaluated for weather resistance, pencil hardness, gloss, adhesion properties, impact resistance and flexing resistance by the following methods.

WEATHER RESISTANCE

A portion of the coating was tested for 6,000 hours in a QUV weather resistance accelerating tester. At the end of the time, coating degradation was examined with the eye.

PENCIL HARDNESS

The scratching test was performed with a Mitsubishi "Uni" pencil, and the maximum hardness at which the coating was not scratched was determined.

GLOSS

Gloss was tested, defined as a 60° mirror reflectance.

ADHESION PROPERTIES

Adhesion properties were measured according to JIS K-5400-5.

IMPACT RESISTANCE

A 1 kg weight having a diameter of ½ inch was dropped on the coating at a distance of 50 cm from a Du Pont Impact Tester. Cracks in the coating were examined with the eye.

FLEXING RESISTANCE

A test portion of the coating was bent 180° with a flex tester, and the state of the coating was examined.

The results of the aforesaid tests are tabulated as follows:

| Weather resistance | No degradation |
|---|---|
| Pencil hardness | 2H |
| Gloss | 75 |
| Adhesion properties | 100/100 |
| Impact resistance | No cracks |
| Flexing resistance | No degradation. |

COMPARATIVE EXAMPLE 1

A coating was formed in the same manner as in Example 1 except that a methyl methacrylate polymer (trade name, "PARAPET" (phonetically) GF-1000, produced by Kyowa Gas Kagaku Co., Ltd.) was used in place of the comb-like polymer "LF-40". The coating was evaluated for weather resistance, pencil hardness, gloss and adhesion properties in the same manner as in Example 1. The results were as follows:

| Weather resistance | No degradation |
|---|---|
| Pencil hardness | 2B |
| Gloss | 48 |
| Adhesion properties | 0/100. |

From the above results, it may be seen that the coating formed from the composition containing the conventional acrylic polymer in place of the graft polymer of the present invention had poor adhesion properties, low hardness and low gloss.

EXAMPLE 2

Seventy parts of polyvinylidene fluoride (Kynar® 500, produced by Pennwalt Corp.), 20 parts of an acrylic polymer containing methyl methacrylate as the major component (trade name, "B-44", produced by Rohm & Haas Co.), and 10 parts of the same graft polymer as used in Example 1 (comb-like polymer "LF-40") were added to a mixed solvent of 30 parts of cyclohexane, 30 parts of butyl acetate and 50 parts of dimethyl phthalate and mixed in a ball mill to prepare a white emulsion-like dispersion. When the dispersion was coated onto a steel plate and heated at 200° C. for 20 minutes, a colorless, transparent coating was obtained.

The coating was evaluated for weather resistance, pencil hardness, gloss, adhesion properties, impact resistance and flexing resistance. The results were as follows:

| Weather resistance | No degradation |
|---|---|
| Pencil hardness | 2H |
| Gloss | 70 |
| Adhesion properties | 100/100 |
| Impact resistance | No cracks |
| Flexing resistance | No degradation. |

COMPARATIVE EXAMPLE 2

A coating was formed in the same manner as in Example 2 except that the graft polymer was not used and 30 parts of the acrylic polymer were employed. The coating was evaluated for weather resistance, pencil hardness, gloss and adhesion properties in the same manner as in Example 1. The results were as follows:

| Weather resistance | No degradation |
|---|---|
| Pencil hardness | H |
| Gloss | 45 |
| Adhesion properties | 10/100 |

From the above results, it can be seen that the coating formed from the composition lacking the graft polymer of the present invention had poor adhesion properties, low hardness and low gloss, absent a primer.

In the coating composition of the present invention, the vinylidene fluoride-based polymer has good compatibility with the graft polymer. A uniform coating may be formed. Furthermore, the coating composition is colorless and transparent.

Adhesion properties to substrates is improved, while maintaining the excellent characteristics of the vinylidene fluoride-based polymer. Thus, the coating composition of the present invention provides coatings which not only have excellent weather resistance, stain resistance, chemical stability and the like, but also excel in adhesion to substrates.

The present invention may be embodied in other specific forms without departing from the spirit or essential attributes thereof and, accordingly, reference should be made to the appended claims, rather than to the foregoing specifications, as indicating the scope of the invention.

I claim:

1. A coating composition comprising:
   (a) a vinylidene fluoride-based polymer;
   (b) a graft polymer formed from the graft polymerization of methylmethacrylate onto an acrylate polymer containing at least one perfluoroalkyl group; and
   (c) at least one organic solvent, said vinylidene fluoride-based polymer comprises from 60% to 95% by weight of the total weight of said vinylidene fluoride-based polymer and said graft polymer.

2. A composition according to claim 1 wherein the vinylidene fluoride-based polymer comprises from 70% to 90% by weight of the total weight of the vinylidene fluoride-based polymer and the graft polymer.

3. A composition according to claim 1 wherein the organic solvent is present in the amount of from about 100 to about 300 parts, by weight, per 100 parts of the combined weight of the vinylidene fluoride-based polymer and the graft polymer.

4. A composition according to claim 1 additionally containing an acrylic polymer.

5. A composition according to claim 1 wherein the vinylidene fluoride-based polymer is selected from the group of vinylidene fluoride/tetrafluoroethylene copolymer and vinylidene fluoride/tetrafluoroethylene/hexafluoropropylene terpolymer.

6. A composition according to claim 5 comprising the following, all parts being by weight:
   (a) 85 parts of a vinylidene fluoride/tetrafluoroethylene/hexafluoropropylene terpolymer;
   (b) 15 parts of the graft polymer; and
   (c) a solvent comprising 20 parts cyclohexanone, 100 parts of methyl ethyl ketone and 100 parts of ethyl acetate.

7. A composition according to claim 4 comprising the following, all parts being by weight:
   (a) 70 parts of polyvinylidene fluoride;
   (b) 20 parts of an acrylic polymer containing methyl methacrylate;
   (c) 10 parts of the graft polymer; and
   (d) a solvent comprising 30 parts of cyclohexanone, 30 parts of butyl acetate and 50 parts of dimethyl phthalate.

* * * * *